United States Patent
Beach et al.

(10) Patent No.: US 7,162,258 B2
(45) Date of Patent: Jan. 9, 2007

(54) LIGHT FIXTURE WIRELESS ACCESS POINTS

(75) Inventors: Robert Beach, Los Altos, CA (US); Ray Martino, Jr., Saratoga, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/758,504

(22) Filed: Jan. 15, 2004

(65) Prior Publication Data

US 2004/0192227 A1 Sep. 30, 2004

Related U.S. Application Data

(60) Provisional application No. 60/440,171, filed on Jan. 15, 2003.

(51) Int. Cl.
*H04Q 7/20* (2006.01)

(52) U.S. Cl. ............... 455/461; 455/90.3; 455/572; 455/575.1; 455/558; 455/552.1; 370/389; 370/396; 370/245; 370/360; 370/359; 370/217; 340/825.52; 710/100; 710/110; 710/315; 710/4

(58) Field of Classification Search ........ 455/90.3, 455/572, 573, 461, 454, 462, 558, 7, 10, 455/16, 19; 370/338, 245, 329, 396, 389, 370/217

See application file for complete search history.

(56) References Cited

U.S. PATENT DOCUMENTS

| | | | | |
|---|---|---|---|---|
| 5,424,859 A * | 6/1995 | Uehara et al. | ............... | 398/127 |
| 5,716,128 A * | 2/1998 | Clark et al. | ............... | 362/221 |
| 5,940,771 A * | 8/1999 | Gollnick et al. | ............... | 455/517 |
| 5,946,617 A * | 8/1999 | Portaro et al. | ............ | 455/422.1 |
| 6,208,629 B1 * | 3/2001 | Jaszewski et al. | ............ | 370/329 |
| 6,229,800 B1 * | 5/2001 | Thompson et al. | ......... | 370/347 |
| 6,233,465 B1 * | 5/2001 | Smith et al. | ................ | 455/560 |
| 6,301,470 B1 * | 10/2001 | Brunner et al. | .......... | 455/278.1 |
| 6,400,968 B1 | 6/2002 | White | | |
| 6,405,049 B1 * | 6/2002 | Herrod et al. | ............... | 455/517 |
| 6,553,020 B1 * | 4/2003 | Hughes et al. | ............... | 370/347 |
| 6,636,749 B1 * | 10/2003 | Holmes et al. | .......... | 455/569.2 |
| 6,654,378 B1 * | 11/2003 | Mahany et al. | ............ | 370/401 |
| 6,694,125 B1 * | 2/2004 | White et al. | ................. | 455/16 |
| 6,711,409 B1 * | 3/2004 | Zavgren et al. | ............ | 455/445 |
| 6,764,012 B1 * | 7/2004 | Connolly et al. | ...... | 235/462.45 |
| 6,832,251 B1 * | 12/2004 | Gelvin et al. | ............... | 709/224 |
| 6,972,661 B1 * | 12/2005 | Wang | ........................ | 340/5.61 |
| 6,990,394 B1 * | 1/2006 | Pasternak | ................... | 700/295 |
| 7,035,586 B1 * | 4/2006 | Finet | ............................ | 455/7 |
| 7,079,808 B1 * | 7/2006 | Striemer | ........................ | 455/7 |
| 2003/0199247 A1 | 10/2003 | Streimer | | |

(Continued)

FOREIGN PATENT DOCUMENTS

JP 61-046632 3/1986

*Primary Examiner*—Marceau Milord
(74) *Attorney, Agent, or Firm*—Ingrassia Fisher & Lorenz, P.C.

(57) ABSTRACT

An access point for a wireless local area data communications network is designed to derive power from a lighting fixture. In one arrangement, the access point includes a housing configured to be received in one or more sockets of a lighting fixture and to replace a lamp which would be inserted therein. In another arrangement, the housing includes a socket for receiving a lamp whereby both the access point and a lighting fixture can be serviced by the socket of the lighting fixture.

21 Claims, 10 Drawing Sheets

U.S. PATENT DOCUMENTS

2003/0224728 A1  12/2003  Heinonen et al.
2004/0203387 A1  10/2004  Grannan
2004/0232849 A1  11/2004  Roach, Jr.

* cited by examiner

LIGHT FIXTURE WIRELESS ACCESS POINTS

CROSS-REFERENCE TO RELATED APPLICATIONS

This application claims priority to the following application which is incorporated herein by reference in its entirety: U.S. Provisional Patent Application No. 60/440,171, entitled "Light Fixture Access Points," filed on Jan. 15, 2003.

BACKGROUND OF THE INVENTION

This invention relates to wireless local area networks, which may use protocols such as IEEE standard 802.11 or the Bluetooth protocol. In such wireless local area networks bubble units communicate with a local area network or a computer through fixed devices called access points. In some systems, such as systems available from Symbol Technologies, assignee of this application, a cell controller is provided which is interconnected to RF ports, which together function as access points in an 802.11 system.

In conventional wireless local area networks, using either access points or RF ports, there is a need to supply the access points or RF port as the fixed wireless communication devices with both electrical power and data network connection to enable the access points or RF ports to couple communications between a mobile unit and a fixed computer. For purposes of this specification the term access points will be used to include RF ports operating with a cell controller.

In conventional technology providing a facility, such as a university or industrial facility, with a wireless local area network, requires that separate cables be provided to each access point supplying electrical power on one cable and data network communications on a second cable. In some instances, wherein RF ports are used as access points, power may be supplied over ethernet cabling that provides both electrical power at low voltage and data network communications to an RF port using a single set of cables. Even in this situation, the routing of cables throughout a facility to be serviced can be one of the largest costs of installing a wireless local area network. In addition, if such cables are installed over existing construction, they can be unsightly and ruin the appearance, for example, in a hospital or office environment. One approach to eliminate the requirement of providing data communications cables throughout a facility is to provide data networking connection by means of wireless repeaters and/or networks. Using this approach the access points do not have a wired network connection, but communicate among themselves to a single access point that is connected into the network. Packets move from the wired network via a single access point or a plurality of access points to other wireless access points through wireless data communications. The access points organize themselves to optimize packet routing while avoiding packet loops.

In some instances communications between access points can be provided using a first radio and communications for which mobile units may be provided using a second radio.

The choice of using one or two radios in the wireless access point depends on the capacity requirement. If a single radio is used, its airtime must be divided between receiving messages from other access points and relaying those messages to the mobile units being served by the access point. Despite a potential reduction in capacity of a wireless network, in many applications large amounts of data traffic are not experienced and a single radio device can be used.

A still existing problem with wireless local area networks that are interconnected by wireless data communications is that the distributed access points still require electrical power. Routing of electrical power to suitable locations for access points can involve considerable expenditure.

It is possible to design access points that plug into existing electrical outlets in a facility, but traditionally the location of such electrical outlets, usually low on walls, is inconvenient for the desired location of access points, which is on the ceiling of a facility.

There is an object of the present invention to provide access points which can be installed onto existing lighting fixtures in a facility and provide complete freedom from wiring in connection with the installation of a wireless local area network.

SUMMARY OF THE INVENTION

In accordance with the invention there is provided a wireless data communication device arranged to be installed in a light fixture having a lamp socket for receiving a lamp. The device includes a housing containing a wireless data communications radio which is arranged to communicate with mobile units and other fixed wireless communications devices forming a data communications network. A connector on the housing is arranged to engage the lamp socket on the light fixture. A socket on the housing is arranged to receive a connector of a lamp and is connected to receive power from the connector on the housing. A power supply in the housing is arranged to receive power from the connector on the housing and provide power to the wireless data communications radio.

The wireless data communications device may be arranged to be installed in a light fixture having a socket for receiving an incandescent bulb. The housing connector is arranged to screw into the socket and the socket on the housing is arranged to receive an incandescent or similar bulb. In another arrangement where the lighting fixture is a fluorescent lamp the housing includes a first connector arranged to engage a socket on the lighting fixture which is arranged to receive a fluorescent tube having a first lamp and the housing socket is arranged to engage a fluorescent tube end, where the housing socket is spaced from an opposed socket on the fixture when the housing is installed on the fixture by a spacing arranged to accommodate a fluorescent tube having a shorter length than the first length. The wireless communications device may include a power supply which includes a rechargeable battery and a recharging circuit. In this case the power supply is arranged to recharge the battery when the connector receives power from the light fixture and the wireless communications radio is powered from the battery when the connector does not receive power from the fixture. The wireless communications radio may be arranged to act as a master device and communicate with mobile units and arranged to act as a slave device to communicate with at least one other fixed location wireless communications device. The radio communications with mobile units or with another fixed wireless communications device may use either IEEE standard 802.11 protocol or blue tooth protocol.

In accordance with the invention there is provided a wireless data communications device arranged to be installed in a light fixture having a lamp socket. The device includes a housing containing a wireless data communications radio arranged to communicate with mobile units and other fixed wireless communications devices forming a data communications network. A connector on the housing is arranged to engage the lamp socket on the light fixture and the power supply in the housing is arranged to receive power from the connector on the housing and provide power to the wireless data communications radio.

The power supply may include a rechargeable battery and a recharging circuit. The power supply can then be arranged to recharge the battery when the connector receives power from the fixture and power the wireless data communications radio using power from the battery when the connector does not receive power from the fixture. The wireless communications radio may be arranged to act as a master device and communicate with mobile units and to act as a slave device and communicate with the at least one other fixed location wireless communications device. The radio communications with the mobile units or the other fixed location wireless communications device can use either IEEE standard 802.11 protocol or blue tooth protocol.

In accordance with the invention there is provided a wireless data communications device arranged to be installed in a fluorescent light fixture having first and second spaced lamp sockets arranged to receive a fluorescent tube. The device includes a housing containing a wireless data communications radio arranged to communicate with mobile units and other fixed wireless communications devices forming a data communications network. First and second spaced connectors on the housing are arranged to engage the lamp sockets on the light fixture and the power supply in the housing is arranged to receive power from the connectors on the housing and to provide power to the wireless data communications radio. The power supply can further include a circuit for emulating the impedance behavior of a fluorescent tube. For a better understanding of the present invention, together with other and further objects, reference is made to the following description, taken in conjunction with the accompanying drawings, and its scope will be pointed out in the appended claims.

DESCRIPTION OF THE INVENTION

Figure 1:
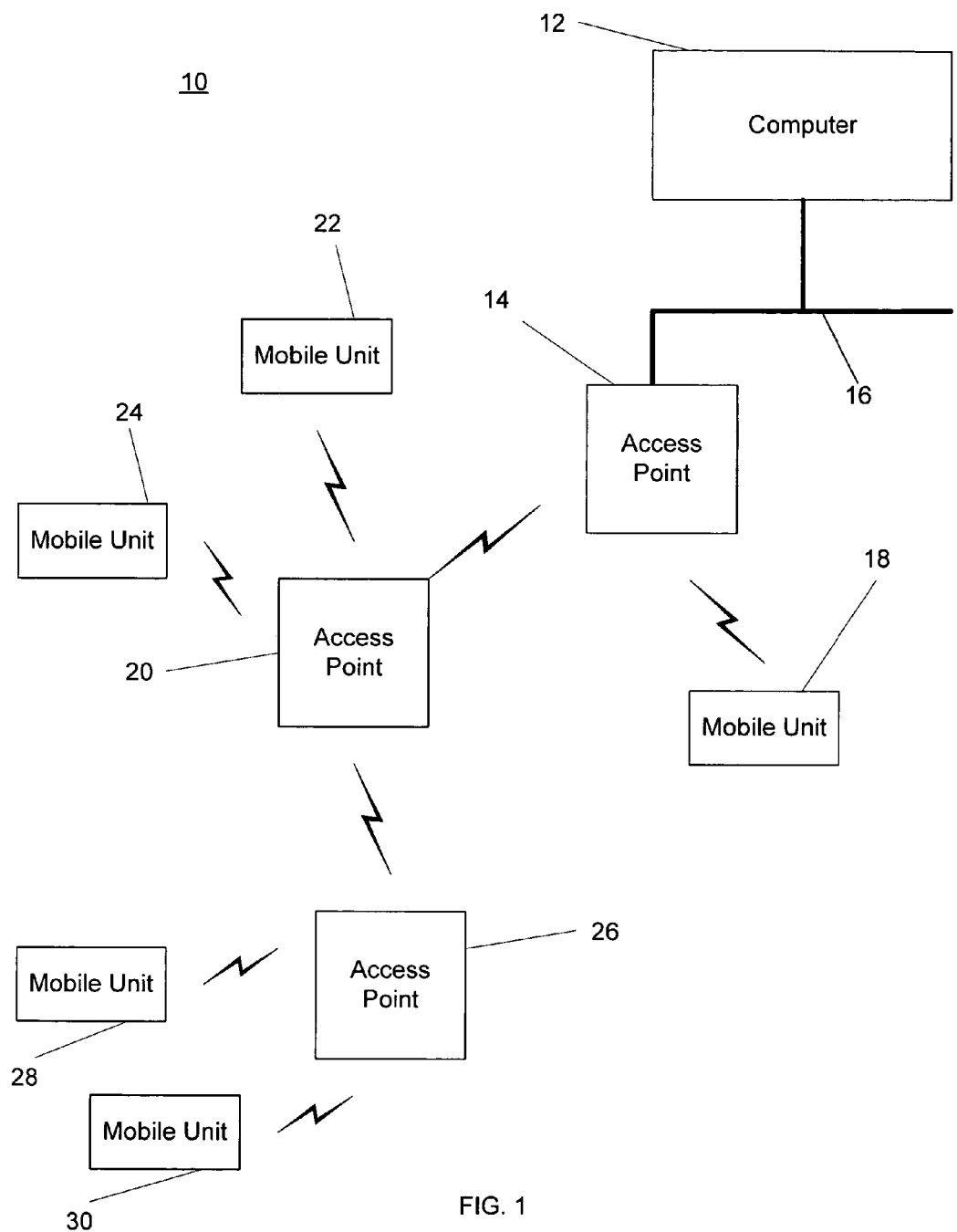
FIG. 1 is a representation of a wireless data communications system in which the present invention is useful.

FIG. 1 is a diagram illustrating a configuration for a wireless local area network 10 in which the present invention may be utilized. The network includes computer 12 connected to a wired network 16 which may be connected to other devices, such as a telephone interface device. The wired network 16 is connected to an access point 14 arranged to communicate with wireless devices, such as mobile unit 18 for wireless data communications. In the arrangement illustrated in FIG. 1, rather than having additional access points connected to wired network 16 access points 20 and 26 communicate with computer 12 via wireless data communication with access point 14. The communication between a particular access point 20, 26 and access point 14 can be direct as indicated by the communication line between access point 20 and access point 14 or can be indirect as indicated by the communication line between access point 26 to access point 20 which thereafter communicates to access point 14. Each of the wireless connected access points 20 and 26 are also arranged for communications with mobile units 22, 24, 28 and 30. Access point 20 may operate in multiple modes in connection with providing wireless local area network communications for mobile units 22 and 24. In a first mode, access point 20 communicates as if it were a mobile until with access point 14 and receives packets destined for mobile units covered by its local area or mobile units covered by local area corresponding to access point 26. Thereafter access point 20 acts as a master unit and communicates with mobile units 22 and 24 to relay data packets received from access point 14 destined to those mobile units. Access point 20 also treats access point 26 as if it were a mobile unit associated with access point 20 and relays data packets intended for mobile units 28 and 30 to access point 26 for subsequent communications from access points 26 to mobile units 28 and 30. While the network 10 illustrated in FIG. 1 includes only three access points, those skilled in the art will recognize that networks may be configured either intentionally or by adaptive software to include many additional access points and may also include alternate routing for communications from a particular wireless access point. For example, in the event access point 20 is experiencing a high volume of traffic, access point 26 can reconfigure to associate with access point 14 directly.

The arrangement illustrated in FIG. 1, wherein wireless access points 20 and 26 provide data communications to associated mobile units without a wired connection to network 16, is advantageous for installation purposes in a facility since it is no longer necessary to provide wired connections between network 16 and the location of access points 20 and 26. The present invention is intended to provide arrangements for providing convenient power to access points 20 and 26 so that these access points do not require special wiring to provide them with power.

Figure 2:
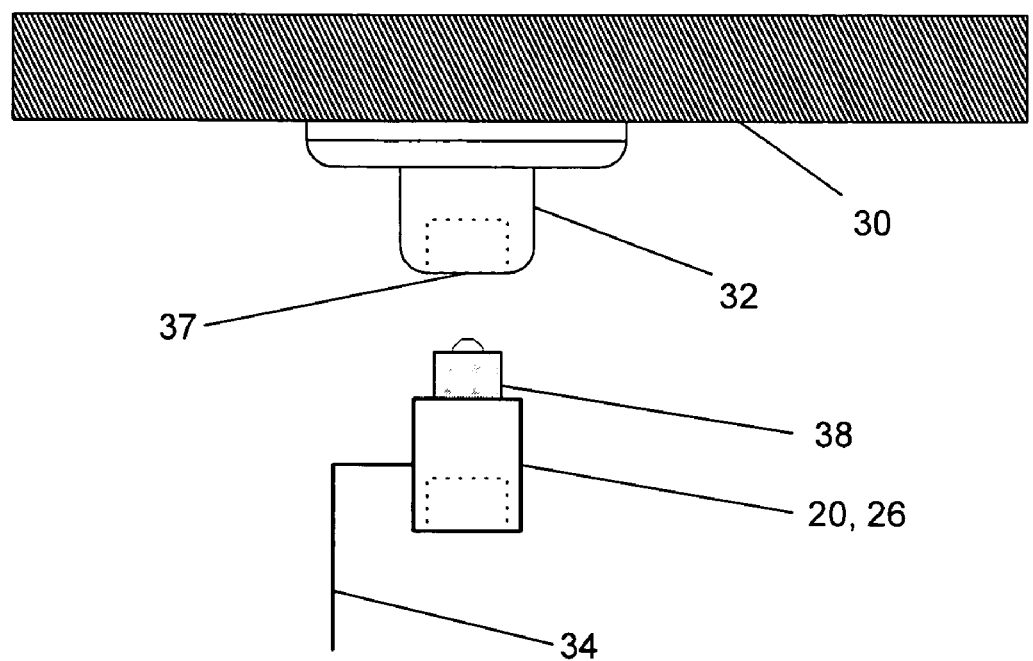
FIG. 2 illustrates a first embodiment of the present invention.

Referring to FIG. 2, there is shown a first exemplary embodiment of the present invention wherein a lighting fixture 32 is mounted on a ceiling 30 and includes a socket 37 adapted to receive a light bulb. A wireless communications device 20 or 26 is provided with a connector 38 adapted to thread into light bulb socket 37 of ceiling fixture 32. Wireless device 20, 26 includes an antenna 34 for communicating with mobile units, such as mobile units 22 or with another access point, such as access point 14. In the embodiment of FIG. 2 wireless device 20, 26 replaces a light bulb which would be normally received into fixture 32 and receives power from the current provider to the fixture.

Figure 3:
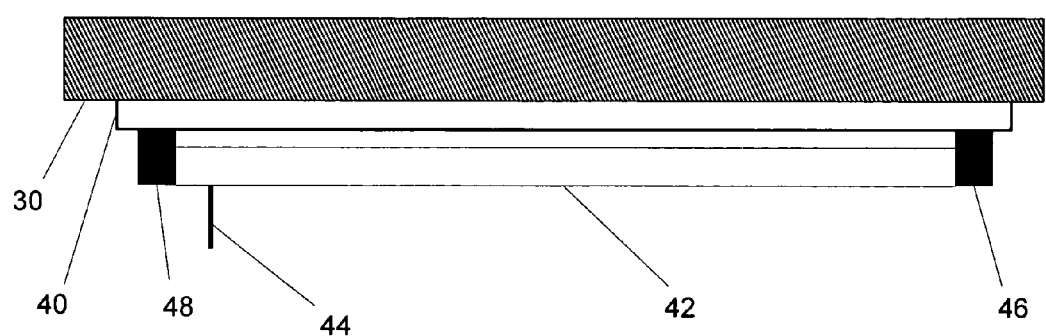
FIG. 3 illustrates a second embodiment of the present invention.

FIG. 3 shows a second embodiment of the invention wherein a fluorescent fixture 40 is mounted on a ceiling 30 and includes sockets 46, 48 which are arranged for receiving a conventional fluorescent tube. In the arrangement of FIG. 3, a wireless communications device 42 is received in sockets 46 and 48 and includes an antenna 44 for providing wireless data communications. The wireless data communications device 42 has end connectors which are arranged to be received in sockets 46, 48 and a power supply which provides power to the wireless data communications device from the power supply to sockets 46 and 48.

Figure 4:
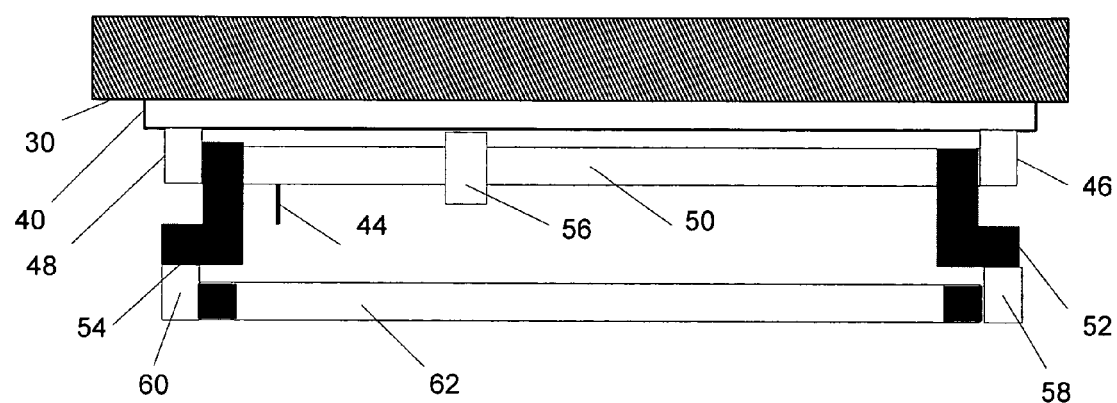
FIG. 4 illustrates a third embodiment of the present invention.

In the arrangements of FIG. 2 and FIG. 3, the wireless data communications device replaces the illumination lamp in an illumination fixture in a facility. In most facilities there are provided sufficient illumination lamps for illuminating the space so that replacement of a few of the illumination lamps with the wireless data communications devices 20 26 or 42 does not affect the overall illumination available within the workspace. FIG. 4 shows a third embodiment of the invention wherein a wireless data communications device 50 having an antenna 44 is inserted into sockets 46, 48 of a fluorescent fixture 40 mounted on ceiling 30. The device 50 shown in FIG. 4 includes extension devices 52 54 having further sockets 58 and 60 for receiving a conventional fluorescent tube 62 which will replace the fluorescent tube that was displaced when the wireless communications device 50 is inserted into the sockets 46 48 of fixture 40. After insertion of the device 50 into the socket of the fluorescent fixture 40 and rotation to engage with the connectors on device 50 with the sockets 46 48, a bracket device 50 may be extended on one or both sides of the wireless communications device 50 to thereafter prevent its inadvertent removal from the socket. Device 56 is intended to slide into engagement with the surface of the fixture 40 and prevent rotation of the wireless communications device 50 which would be required for its removal from a conventional fluorescent tube socket arrangement.

Figure 5:
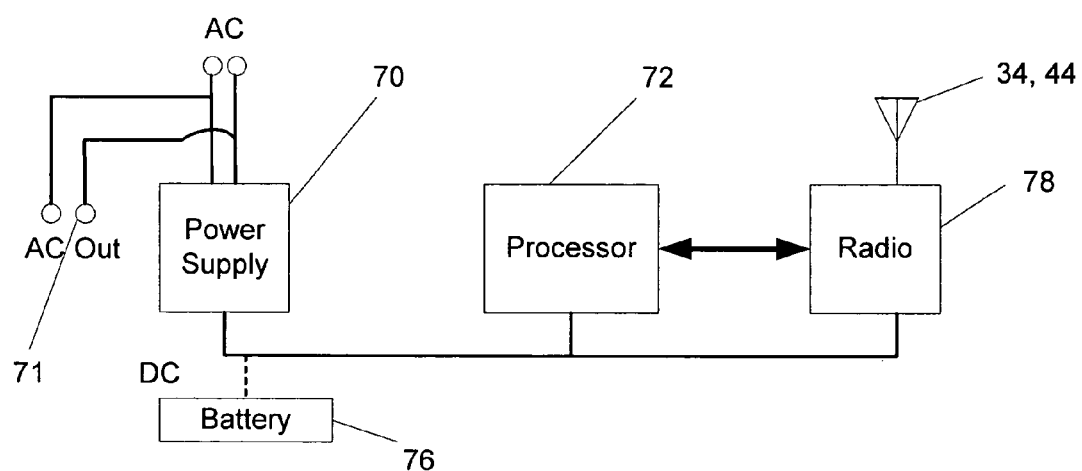
FIG. 5 is a block diagram illustrating one embodiment of the wireless data communications device useful in the embodiment of FIGS. 2, 3 and 4.
Figure 6:
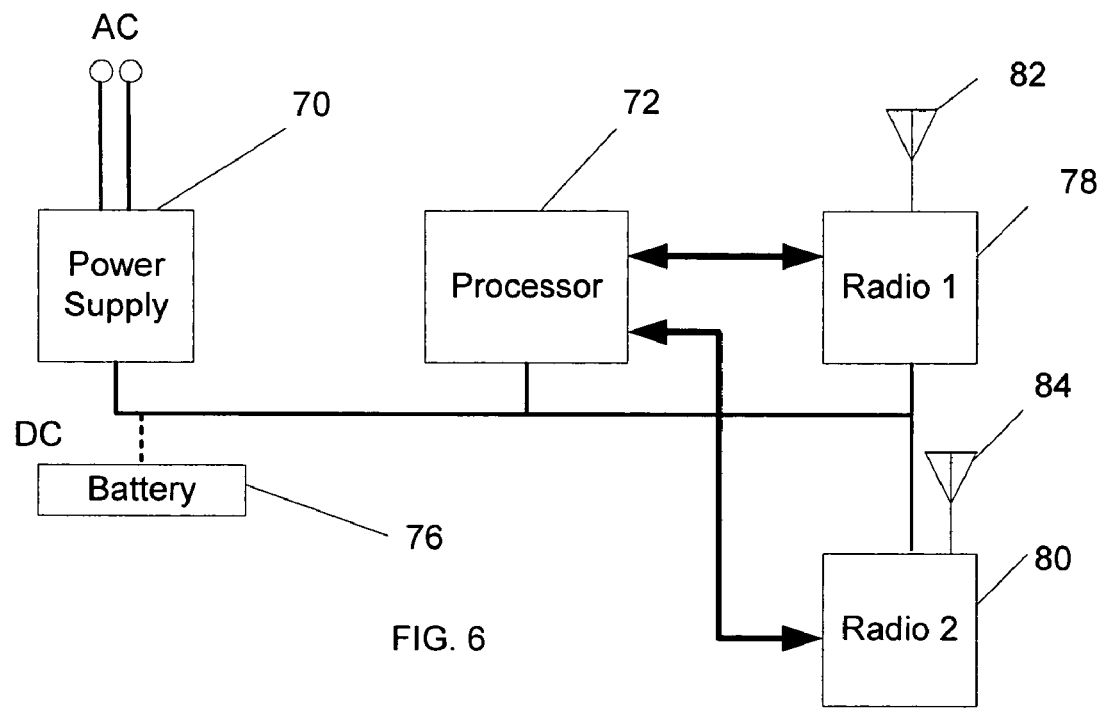
FIG. 6 is a block diagram illustrating a second arrangement of the wireless data communications device which may be used in the embodiment of FIGS. 2, 3 and 4.

Referring to FIGS. 5 and 6 there are shown alternate arrangements for the wireless data communications device provided in the housings of FIGS. 2, 3, 4, 7 and 9A.

In a first arrangement shown in FIG. 5, there is provided a power supply 70 which receives AC power from the connector inserted into the socket of the lighting fixture. The power supply 70 provides DC current to power a processor 72 and a radio 74 having an antenna 34, 44. The processor 72 is arranged to receive data from either another access point or from a mobile unit and to cause the radio 74 to retransmit the data. In connection with an access point, for example 20 shown in FIG. 1, radio 74 may act as a mobile unit when it communicates with access point 14 and receives data packets therefrom. Once a data packet destined for a mobile unit 22, 24 is received by processor 72, radio 74 is caused to act as an access point and relay the data packet to the appropriate mobile unit using the selected communications protocol.

In a preferred embodiment the arrangement of FIG. 5 may include a rechargeable battery 76, which receives power from power supply 70 when AC power is supplied thereto from the connector inserted into a lighting fixture socket. When AC power is no longer available, battery 76 provides power to processor 72 and radio 74, such that the access point will continue to function, for example, when the facility is closed, is in a low-light condition, or during a power failure.

FIG. 6 shows an alternate arrangement for the circuits of a wireless data communications device in accordance with the present invention. In the arrangement of FIG. 6 the processor 72 communicates with a first radio 78 and a second radio 80. Both radios are supplied with power from power supply 70 and optionally battery 76. Radio 78 may be used exclusively to communicate with a higher order access point; for example, in the instance of access point 20, radio 78 would communicate with access point 14 and act as a mobile unit with respect to access point 14. Radio 80 would be configured to act as an access point for mobile units 22 and 24 and communicate data packets to those mobile units. The arrangement of FIG. 6 may be desired even with the use of 2 radios, since the radios and associated circuits are often packaged as large-scale integrated circuits which are manufactured in large quantity and are thereby relatively inexpensive. In the arrangement of FIG. 6, the radio 78 can be a radio arrangement designed for use in a mobile unit while the radio unit 80 can be a radio unit designed to use as an access point.

Figure 7:
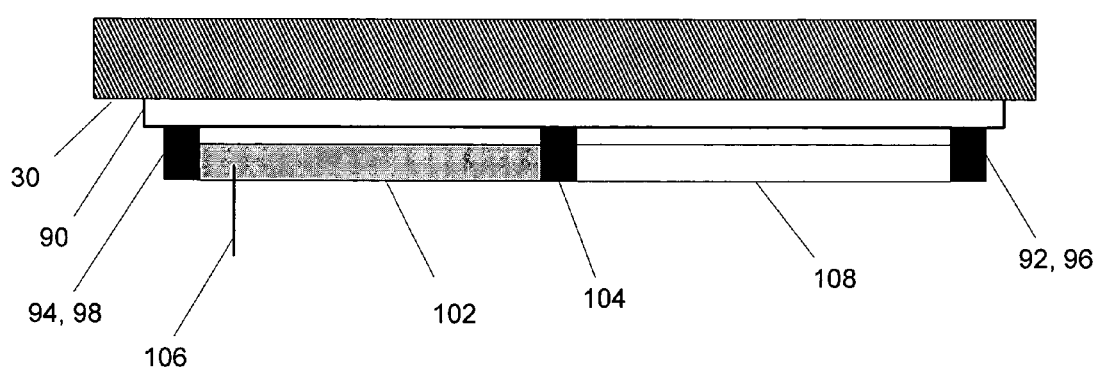
FIG. 7 is a side view illustrating a fourth embodiment of the invention.
Figure 8:
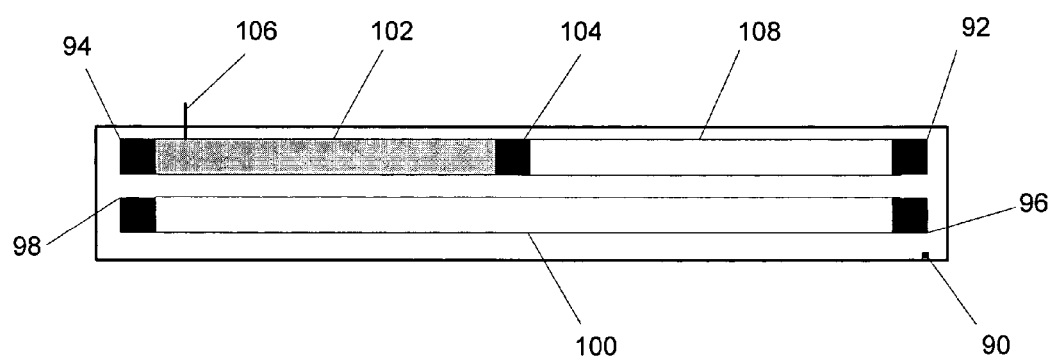
FIG. 8 is a bottom view of the embodiment of FIG. 7.

FIGS. 7 and 8 illustrate a fourth embodiment of the invention wherein a fluorescent tube fixture 90, which is arranged to receive four 48-inch fluorescent tubes is mounted on ceiling 30. Fixture 90 includes sockets 92, 94, 96 and 98 which are arranged to receive two 48-inch fluorescent tubes. Fluorescent tube 100 is inserted between sockets 98 and 96 in a conventional manner. Wireless communications device in housing 102 is inserted into socket 94 and includes its own socket 104 which is arranged to receive a two 24-inch fluorescent tube 108 which is connected between socket 92 and socket 104 on wireless communications device 102. Socket 104 may be arranged with an adhesive surface to secure it to fixture 90. Alternatively, a threaded screw may be used to attach socket 104 firmly to fixture 90. Antenna 106 is provided extending from the housing device 102.

Figure 9:
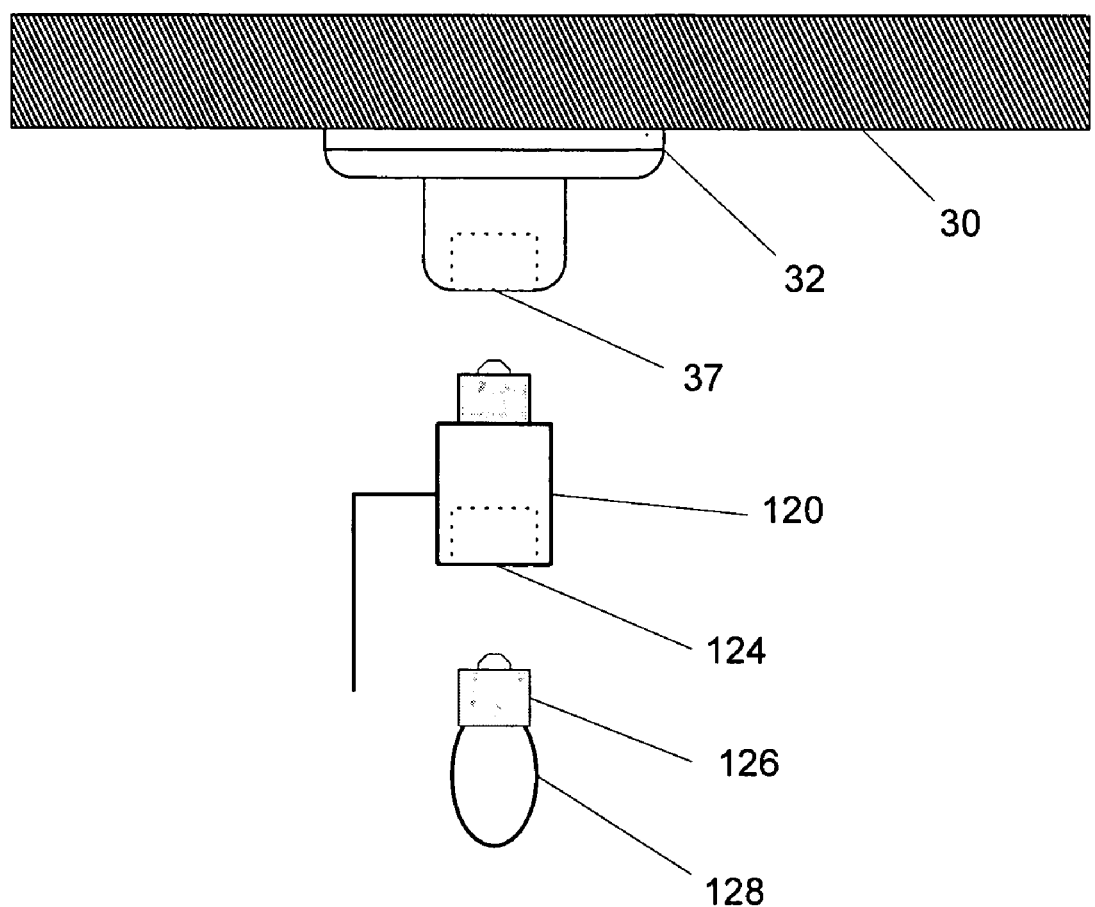
FIG. 9 illustrates a fifth embodiment of the present invention.

Referring to FIG. 9, there is shown a fifth embodiment of the invention, wherein an incandescent lamp fixture 32 having a socket 37 is mounted to a ceiling 30. A wireless communications device having a housing 120 and a connector 122 is arranged to screw into socket 37 of fixture 32. Housing 120 includes a further socket 124 which is arranged to receive the connector 126 of incandescent bulb 128. Accordingly, the arrangement of FIG. 9 enables the provision of a wireless communications device in housing 120 which can be powered from the same fixture as incandescent lamp 128.

Figure 9A:
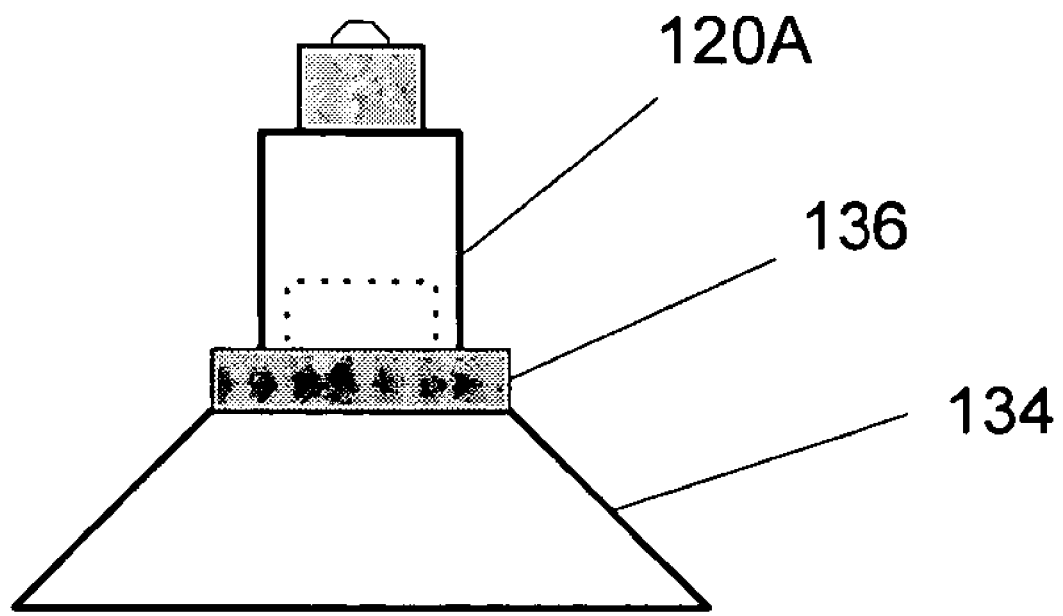
FIG. 9A illustrates a variation of the embodiment illustrated in FIG. 9.

The use of a housing 120 in the vicinity of an incandescent lamp 128 may cause a significant thermal loading on the wireless communications device contained within housing 120. An alternate arrangement to the arrangement of FIG. 9 is shown in FIG. 9A wherein housing 120A includes a thermal shield 136 and optionally a reflector 134 which will reflect the heat of the incandescent lamp away from the housing 120A containing the wireless data communications device. The device of FIG. 9A may enclose an alternate folded dipole antenna arrangement.

In another embodiment of the present invention, the wireless communication device could additionally be configured through a control channel which operates over the AC power network which is used to provide power to the light fixtures. The additional of such circuitry could, in addition to providing other benefits, facilitate control and configuration of the wireless communication devices. The channel which is established across the AC power network could be a low data rate powerline communications channel as is known in the prior art, or some other means for utilizing the AC powerline network to communication with a device arranged according to the present invention.

While the embodiments herein have been described as what are believed to be the preferred embodiments of the invention, those skilled in the art will recognize that other and further changes and modifications may be made thereto without departing from the spirit of the invention, and it is intended to claim all such changes and modifications as fall within the true scope of the invention.

We claim:

1. A wireless data communications device, arranged to be installed in a light fixture having a lamp socket for receiving a lamp, comprising:
a housing containing a wireless access point arranged to communicate with mobile units and other fixed wireless communications devices forming a data communications network;
a connector on said housing arranged to engage said lamp socket on said light fixture;
a socket on said housing arranged to receive a connector of a lamp and connected to receive power from said connector and said housing; and
a power supply in said housing arranged to receive power from said connector on said housing and provide power to said wireless access point.

2. A wireless data communications device as specified in claim 1 arranged to be installed in a light fixture having a socket for receiving an incandescent bulb, wherein said housing connector is arranged to screw into said socket, and wherein said socket on said housing is arranged to receive an incandescent bulb.

3. A wireless data communications device as specified in claim 1 wherein said light fixture is a florescent lamp, and wherein said housing includes a first connector arranged to engage a socket on said light fixture arranged to receive a florescent tube having a first length and the housing socket arranged to engage a florescent tube end, said housing socket being spaced from an opposed socket on said fixture when said housing is installed on said fixture, by a spacing arranged to accommodate a florescent tube having a shorter length than said first length.

4. A wireless communications device as specified in claim 1 wherein said power supply further includes a rechargeable battery and a recharging circuit, and wherein said power supply is arranged to recharge said battery when said connector receives power from said fixture and said wireless access point receives power from said battery when said connector does not receive power from said fixture.

5. A wireless communications device as specified in claim 4 wherein said wireless access point is arranged to act as a master device and communicate with mobile units and arranged to act as a slave device and communicate with at least one other fixed location wireless communications device.

6. A wireless communications device as specified in claim 5 wherein said access point communicates with mobile units using IEEE Standard 802.11 protocol.

7. A wireless communications device as specified in claim 6 wherein said access point communicates with said at least one other fixed wireless communications device using IEEE standard 802.11 protocol.

8. A wireless communications device as specified in claim 5 wherein said access point communicates with mobile units using Bluetooth protocol.

9. A wireless communications device as specified in claim 8 wherein said access point communicates with said at least one other wireless communications device using IEEE standard 802.11 protocol.

10. A wireless communications device as specified in claim 8 wherein said access point communicates with said at least one other wireless communications device using Bluetooth scatternet protocol.

11. A wireless communications device as specified in claim 1 further comprising at least one arrangement for communicating over and AC power network through said connector on said housing.

12. A wireless data communications device, arranged to be installed in a light fixture having a lamp socket, comprising:
a housing containing a wireless access point arranged to communicate with mobile units and other fixed wireless communications devices forming a data communications network;
a connector on said housing arranged to engage said lamp socket on said light fixture; and
a power supply in said housing arranged to receive power from said connector on said housing and provide power to said wireless access point.

13. A wireless communications device as specified in claim 12 wherein said power supply further includes a rechargeable battery and a recharging circuit, and wherein said power supply is arranged to recharge said battery when said connector receives power from said fixture and power said wireless access point using power from said battery when said connector does not receive power from said fixture.

14. A wireless communications device as specified in claim 12 wherein said wireless access point is arranged to act as a master device and communicate with mobile units and arranged to act as a slave device and communicate with at least one other fixed location wireless communications device.

15. A wireless communications device as specified in claim 14 wherein said access point communicates with mobile units using IEEE standard 802.11 protocol.

16. A wireless communications device as specified in claim 15 wherein said access point communicates with said at least one other wireless communications device using IEEE standard 802.11 protocol.

17. A wireless communications device as specified in claim 14 wherein said access point communicates with mobile units using Bluetooth protocol.

18. A wireless communications device as specified in claim 17 wherein said access point communicates with said at least one other fixed location wireless communications device using IEEE 802.11 protocol.

19. A wireless communications device as specified in claim 17 wherein said access point communicates with said at least one other wireless communications device using Bluetooth scatternet protocol.

20. A wireless communications device as specified in claim 12 further comprising at least one arrangement for communicating over AC power network through said connector on said housing.

21. A wireless data communications device, arranged to be installed in a florescent light fixture having first and second spaced lamp sockets arranged to receive a florescent tube comprising:
a housing containing a wireless access point arranged to communicate with mobile units and other fixed wireless communications devices forming a data communications network,
first and second spaced connectors on said housing arranged to engage said lamp sockets on said light fixture; and
a power supply in said housing arranged to receive power from said connectors on said housing and provide power to said wireless access point, said power supply further including a circuit for emulating the impedance behavior of a florescent tube.

* * * * *

UNITED STATES PATENT AND TRADEMARK OFFICE
CERTIFICATE OF CORRECTION

| | | |
|---|---|---|
| PATENT NO. | : 7,162,258 B2 | Page 1 of 1 |
| APPLICATION NO. | : 10/758504 | |
| DATED | : January 9, 2007 | |
| INVENTOR(S) | : Robert Beach et al. | |

It is certified that error appears in the above-identified patent and that said Letters Patent is hereby corrected as shown below:

In claim 11, column 7, line 66, delete the word "and" between the words "over" and "AC".

Signed and Sealed this

Thirteenth Day of March, 2007

JON W. DUDAS
*Director of the United States Patent and Trademark Office*